Nov. 25, 1941.                P. RABILLOUD                2,264,267
       WEIGHING APPARATUS FOR THE ADDITION OF DIFFERENT PRODUCTS
              OF VARIABLE BULK AND IN GIVEN PROPORTIONS
                        Filed Dec. 28, 1939

Inventor
P. Rabilloud
By: Glascock Downing & Seebold
Attys.

Patented Nov. 25, 1941

2,264,267

UNITED STATES PATENT OFFICE 2,264,267

WEIGHING APPARATUS FOR THE ADDITION OF DIFFERENT PRODUCTS OF VARIABLE BULK AND IN GIVEN PROPORTIONS

Pierre Rabilloud, Paris, France

Application December 28, 1939, Serial No. 311,435
In France January 13, 1939

2 Claims. (Cl. 265—30)

The present invention has for object a weighing apparatus serving for the addition of different products, of variable bulk and in given proportions; this apparatus can be used for instance for the impregnation of hams by means of a quantity of brine proportional to their weight, this application being given of course as nonlimiting. Up to now the impregnation of hams is effected by injecting a quantity of brine equal to a definite fraction of their weight, for instance five to ten per cent of the latter. As the hams to be treated are of different bulk, it is necessary each time to determine their weight, to calculate the quantity of brine to be injected and the total weight of the ham after impregnation, then to adjust the weighing apparatus supporting the ham during the injection so that the latter can be stopped at the very instant the desired weight is reached. The calculation can be rapid if tables are available, but the adjusting or taring of the weighing apparatus by means of weights varying each time is a cause of loss of time and errors.

On the other hand, the usual weighing apparatus are arranged in such a manner that their mechanism is compulsorily wetted by the brine employed and they are rapidly rendered useless by the corrosive action of the latter on the metals.

In order to remedy these inconveniences, the present invention consists in devising the weighing apparatus in such a manner that any reading of the weight, and any calculation are unnecessary, that the adjusting or taring for the addition of a given proportion of brine or other added product is always obtained by means of one and the same tare placed at one and the same point, and also that the mechanism does not risk being contaminated by added product. The characteristic arrangements of this apparatus will be described with reference to the accompanying drawing, by way of example.

Figure 1:
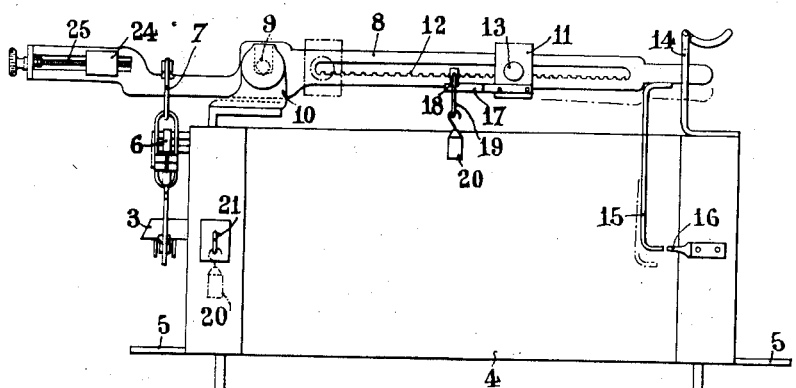
Fig. 1 is an elevation of the apparatus in equilibrium when it is loaded with an impregnated ham.

This apparatus comprises a movable tray 1 hung by rods 2 and a link-work not shown from a lever 3 oscillating about a horizontal axis. Said link-work is enclosed in a casing 4 adapted to be supported by means of lateral lugs 5 on fixed supports. The particular arrangements of said link-work can be of any known type, for instance with four-bar motions compelling the tray 1 to remain parallel to itself.

The movable end of the lever 3 is connected by a link to another lever 6 pivoted on one side of the casing 4 and hung by a link 7 to the small arm of a beam 8 which rests by means of a knife-edge 9 on a bearing 10 secured above the casing.

Along the long arm of said beam slides a counterweight 11 which can be held stationary at various points of its length for instance owing to a rack 12 and a locking knob 13 screwed on a small pinion rolling on said rack. The movable end of this long arm is guided in a yoke 14 secured on the casing and carries an adjusting needle 15 movable opposite a fixed index 16.

To the counterweight 11 is rigidly secured a rod 17 provided with a knife-edge 18 supporting a ring 19 from which a tare 20 can be hung; the latter can also be hung from a ring 21 secured to the casing.

The ham 22 which is to be treated can be placed either directly on the tray 1, or in a bowl 23 placed on the latter. Before placing the ham in position of the apparatus, the equilibrium of the latter is adjusted by bringing the counterweight 11 to the end of its stroke towards the knife-edge 9 as shown in dot and dash lines in Fig. 1, and by moving a small counterweight 24 mounted on a screw threaded rod 25 carried by the small arm of the beam. It is to be noted that when the counterweight 11 is thus moved to the end of its stroke, the knife-edge 18 is located in vertical alignment with the knife-edge 9.

Figure 2:
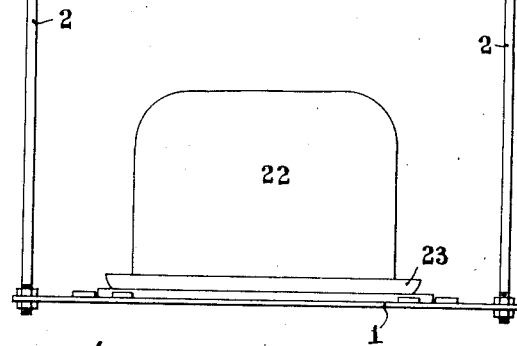
Figs. 2, 3 and 4 are diagrams showing the equilibrium of the apparatus empty, then loaded with a non impregnated ham and finally loaded with the same ham after impregnation.

The adjusting counterweight 24 having been moved to the position in which the needle 15 is just opposite the index 16, the equilibrium of the empty apparatus can be expressed as follows:

If $A$ designates (Fig. 2) the weight of the beam 8 including the counterweight 24, but without the counterweight 11, and $a$ the distance from the centre of gravity of this unit 8, 24, to the knife-edge 9;

$B$ the vertical load transmitted to the beam 8 by the levers 3, 6 and the link 7 under the action of the weight of the tray 1, the bowl 23, the rods 2 and the link-work not shown, and $b$ the distance of this vertical load to the knife-edge 9;

$C$ the weight of the counterweight 11 (including its rod 17 and the ring 19) and $c$ the distance from the centre of gravity of this movable unit to the knife-edge 9; it will be seen that equilibrium is obtained when:

(1) $$Bb = Aa + Cc$$

Figure 3:
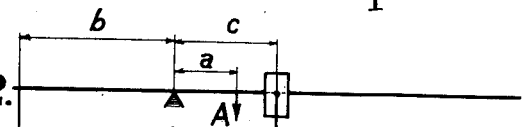

When the ham to be treated, of a weight $J$, is placed on the tray of the apparatus, equilibrium is again established by moving the counterweight 11 to the amount $x$ (Fig. 3), so that its distance from the knife-edge 9 becomes $c+x$, equilibrium is again obtained when (2) $$(B+J)b = Aa + C(c+x)$$

Before injecting the brine, it suffices to unhook the tare 20 from the ring 21 and to hook it on the ring 19; this causes the beam 8 to incline as shown in dot and dash lines. The brine is then injected in the ham until the needle 15 comes back opposite the index.

Let $T$ be the weight of the tare 20; as the distance from the knife-edge 18 to the centre of gravity of the counterweight 11 is equal to the distance designated above by $c$, it will be seen that the centre of gravity of the tare 20 is located at a horizontal distance from the knife-edge 9 precisely equal to $x$.

Figure 4:
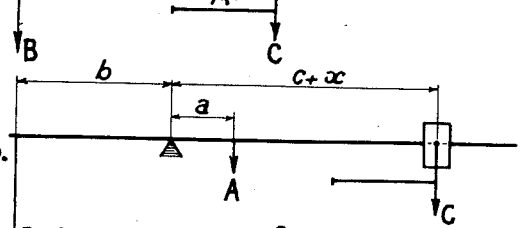

If $S$ designates the weight of brine which reestablishes equilibrium (Fig. 4), the latter is expressed by the equation (3) $$(B+J+S)b = Aa + C(c+x) + Tx$$

From Equations 1 and 2 is taken (4) $$Jb = Cx$$

and from Equations 2 and 3 is taken (5) $$Sb = Tx$$

By dividing Equations 4 and 5 one by the other, can be deducted:

$$\frac{S}{J} = \frac{T}{C}$$

In other words, the ratio of the weight of brine relatively to the weight of the ham is equal to the ratio of the weights of the tare 20 and the counterweight 11.

Consequently, it suffices, for obtaining an impregnation of a given ratio, for instance 7% of the weight of the ham, to choose a tare 20 the weight of which is 7% that of the counterweight. The operation can thus be effected without it being necessary to make any reading of the weight nor any calculation; the only operations to be effected—removal of the tare 20, placing the ham on the tray, balancing by sliding the counterweight 11, hooking the tare 20 on the ring 19 and injecting the brine until equilibrium is again established—are rapid, necessitates no special attention, and are not apt to cause errors as in the methods used up to now. Furthermore, as all the mechanical parts of the apparatus are located well above the ham to be treated, they do not risk being contaminated by the brine.

A series of various tares corresponding to the various percentages of impregnation provided, can be placed at the operator's disposal.

It is to be noted that the apparatus can serve to add any products whatever one to the other in any desired proportions; in the case in which several different products are to be added successively in one and the same operation, tares can be provided which are capable of being hung in a corresponding number to the knife-edge 18, either on the same ring 19, or one below the other. Thus, without departing from the scope of the invention the constructional arrangements of the various parts of the apparatus can be varied, for instance the device serving to hold the counterweight 11 stationary on the beam, to adjust the equilibrium, etc.

I claim:

1. In a weighing apparatus the combination of a balance beam, means for transmitting the weight of the loads to be weighed on an invariable point of one of the arms of the beam, a counterweight sliding along the other arm of the beam, a supplementary removable counterweight, and means for hanging said supplementary counterweight from said sliding counterweight at a point located between the latter and the rocking axis of the beam, at a given distance from the centre of gravity of said sliding counterweight, said distance being such that, when the load to be weighed is null and when the sliding counterweight is in position for balancing the beam, said point of suspension of the supplementary counterweight is located in vertical alignment with the rocking axis of the beam.

2. In a weighing apparatus the combination of a balance beam, means for transmitting the weight of the loads to be weighed on an invariable point of one of the arms of the beam, a counterweight sliding along the other arm of the beam, a rod rigidly secured to said counterweight and extending laterally on the side of the rocking axis of the beam, a supplementary counterweight, means for hooking at a given point of said rod, said supplementary counterweight adapted to be removably hung from said hooking means, the horizontal distance between the centre of gravity of said sliding counterweight and the point of suspension of said supplementary counterweight being such that, when the load to be weighed is null and when the sliding counterweight is in position for balancing the beam, said point of suspension of the supplementary counterweight is located in vertical alignment with the rocking axis of the beam.

PIERRE RABILLOUD.